United States Patent [19]

Gitman

[11] Patent Number: 4,664,618
[45] Date of Patent: May 12, 1987

[54] RECUPERATIVE FURNACE WALL

[75] Inventor: Grigory M. Gitman, Duluth, Ga.

[73] Assignee: American Combustion, Inc., Norcross, Ga.

[21] Appl. No.: 642,075

[22] Filed: Aug. 16, 1984

[51] Int. Cl.⁴ .............................................. F23D 11/44
[52] U.S. Cl. ..................................... 431/11; 431/116; 431/167; 431/215; 432/31; 432/83; 432/177; 432/179; 432/180
[58] Field of Search ................... 431/9, 115, 116, 161, 431/166, 167, 11, 215, 243; 432/31, 78, 83, 177, 178, 179, 180, 181, 182, 222, 223; 165/9.1, 9.3, 9.4

[56] References Cited

U.S. PATENT DOCUMENTS

| | | |
|---|---|---|
| 180,274 | 7/1876 | Robertson . |
| 1,358,330 | 11/1920 | Rockwell ............................ 432/177 |
| 2,548,485 | 4/1951 | Lubbock ........................... 431/243 X |
| 2,919,549 | 1/1960 | Haworth et al. ................... 60/39.65 |
| 3,655,356 | 4/1972 | Javaux ................................ 65/182 R |
| 4,038,022 | 7/1977 | Blackman ............................. 431/166 |
| 4,125,354 | 11/1978 | Andrews ................................ 431/11 |
| 4,210,411 | 7/1980 | Ward et al. .......................... 431/160 |
| 4,245,572 | 1/1981 | Sharp .................................. 110/336 |
| 4,262,740 | 4/1981 | Brune .................................... 165/67 |
| 4,363,623 | 12/1982 | Brune .................................. 432/219 |
| 4,391,227 | 7/1983 | Forster et al. ......................... 122/16 |

FOREIGN PATENT DOCUMENTS

| | | |
|---|---|---|
| 815643 | 7/1959 | United Kingdom ............... 431/167 |
| 1248912 | 10/1971 | United Kingdom . |
| 1332125 | 10/1973 | United Kingdom . |
| 382903 | 8/1973 | U.S.S.R. ............................. 432/223 |

Primary Examiner—Margaret A. Focarino
Attorney, Agent, or Firm—Needle & Rosenberg

[57] ABSTRACT

The present invention relates to a method and apparatus for waste heat recovery and reduction in industrial furnaces and heating equipment. The method of heat recovery comprises directing the exhaust gases through a system of channels inside the refractory wall where heat from the flue gases is transferred to the refractory lining and also to the combustion air traveling inside of a heat exchanger also located inside said channels. The high temperature exhaust flue gases traveling along said channels increase the hot face temperature of the refractory wall and reduce the heat flux from the working chamber through the refractory wall. An apparatus for the realization of the heat recovery method includes a flue duct, a recuperator, hot air piping and a hot air burner, all located inside the furnace wall refractory lining.

24 Claims, 4 Drawing Figures

RECUPERATIVE FURNACE WALL

BACKGROUND OF THE INVENTION

This invention relates to a method and apparatus for waste heat recovery and reduction in industrial furnaces and heating equipment.

Three alternative methods for recovery of latent heat of flue gases escaping from high temperature furnace working chamber are common: (a) use of waste heat to preheat combustion air; (b) use of waste heat for initial preheating of the work; and (c) use of hot flue gases for other low temperature operations such as drying or steam generation.

All three methods have come into wide use during the past decade. Steadily rising fuel prices have continually lowered the minimum size of furnace which can justify use of these heat recovery methods. Combustion air preheating by recuperation is the most common method in use today because of the relatively low capital and operational costs involved. Recuperation also has the advantage of a good relationship between the availability of waste heat and the need for that heat in the incoming combustion air.

Initially, the general concept of combustion air preheating was accomplished by means of a central external recuperator, hot air ducts and a set of hot air burners for heating the furnace.

More recently, the most common choice of heat recovery for industrial furnaces is utilization of an individual recuperator for each hot air burner. This has made it possible to reduce the cost of both recuperators and hot air burners through volume production. As used in this manner, the recuperator can be either radiative, radiative-convective, or convective. It can be made of metal or refractory materials.

Further development of this general concept has resulted in several specific improvements such as selfrecuperative burners and side-by-side recuperator-burners, which have the common design approach of reducing the cost of the system by combining the recuperator and burner into one integral unit, eliminating the need for hot air ducting and in some cases reducing the amount of insulating material involved. However, these approaches have the obvious limitations of restricted capacity, limited heat recovery and large physical size for a given capacity. Although many self-recuperative burners have been designed, few are used with success. The major disadvantage of these burners is that positioning the flue outlet very close to the flame envelope results in losing a significant part of the hot combustion product before its heat has been transferred to the load.

Another approach is the internal recuperator, which consists of stainless steel piping located in the existing furnace exhaust flue. Hence, this design uses the exhaust flue as the housing for a bundle of pipes which contain the combustion air being heated. The advantage of this approach is the utilization of the flue duct as the housing for the heat-exchanger, but the disadvantages are: a high pressure drop resulting in poor circulation inside the furnace chamber, limited surface area of the heat exchanger and therefore reduced heat recovery, a complicated flue channel structure, and low durability of the castable refractory dividing wall between the flue channel and the furnace chamber.

In addition, it is desirable to prevent the loss of heat through the walls of the furnace, by the use of walls with good insulation. Historically, this has been accomplished by means such as constructing the walls of the furnace with brick.

The development of new ceramic fiber based insulating materials having high thermal resistance, low density and specific heat made it possible to substitute heavy refractory furnace linings for light metal structures lined with ceramic blanket or blocks. This current improvement has changed the traditional design of furnace walls and has made it possible to fabricate furnace walls with prefabricated modules containing mild steel plate lined with ceramic fiber materials.

SUMMARY OF THE INVENTION

The present invention comprises a method of heat recovery and an apparatus for realization of heat recovery inside of the furnace refractory lining. The method of heat recovery comprises directing the exhaust gases through a system of channels inside the refractory wall where heat from the flue gases is transferred to the refractory lining and also to the combustion air traveling inside of a heat exchanger also located inside said channels. The high temperature exhaust flue gases traveling along said channels increase the hot face temperature of the refractory wall and reduce the heat flux from the working chamber through the refractory wall.

An apparatus for the realization of the heat recovery method includes a flue duct, a recuperator, hot air piping and a hot air burner, all located inside the furnace wall refractory lining. The flue duct is formed by a multiplicity of channels located inside the refractory wall and directed along the wall. One channel wall is formed by a refractory partition dividing the working zone of the furnace from said channel. The other three channel walls are formed within the lining material by a recuperator structure positioned generally parallel to the walls of said channels. Flue gases which are exhausted from the working chamber of the furnace are directed into said channels and are moved through these channels by positive pressure existing inside the furnace working chamber. Because of the temperature differential between the flue gases and the combustion air in the recuperator, a significant portion of the latent heat of the flue gases is transferred to the combustion air running inside the recuperator. The partition wall dividing the working zone of the furnace from these internal channels is heated by the flue gases traveling inside the channels. This reduces considerably heat losses from the working zone through the refractory lining wall. Combustion air preheated by the recuperator moves along a hot air duct to a hot air burner. The wall structure uses the furnace refractory lining as an insulating means for the hot air duct and also for the hot air burner. The hot air burner has a hot air inlet located inside the refractory lined wall.

The recuperative furnace wall may be made as modular units combining all of the elements of the invention. The furnace wall module may be used as a heating device, for example, for preheating of ladles for molten metal transportation, or as a preheater of tundish for a continuous caster. Different furnaces and heating apparatus can be designed with such multipurpose wall modules.

Another aspect of this invention provides a new heat recovery system for a heating apparatus, such as heat treating furnaces with controlled atmospheres, which is capable of recovering heat from flue gases containing combustible components by combustion of the exhaust gases inside of the refractory lined wall. The additional heat generated by post-combustion of exhaust gases traveling through the channels positioned inside the refractory lining of furnaces is recovered by the same method and apparatus as described above. A controlled portion of an oxygen containing gas mixture (for example, air) is introduced and mixed with flue gases traveling through the channels inside the refractory lined wall for combustion of combustible components of the flue gases.

Therefore, it is an object of this invention to provide a method and apparatus to provide more effective heat recovery from hot flue gases escaping from furnaces, resulting in more efficient operation of said furnace.

It is another object of this invention to provide a more economical method and apparatus for heat recovery from hot flue gases escaping from a furnace.

It is a further object of this invention to provide a modular means for heat recovery from hot flue gases which may be adapted for use in a number of designs or types of furnaces and to significantly reduce custom engineering expenses.

Other objects, advantages and novel features of the present invention will become apparent from the following detailed description of the invention when considered in conjunction with the accompanying drawings.

DESCRIPTION OF THE PREFERRED EMBODIMENT

Figure 1:
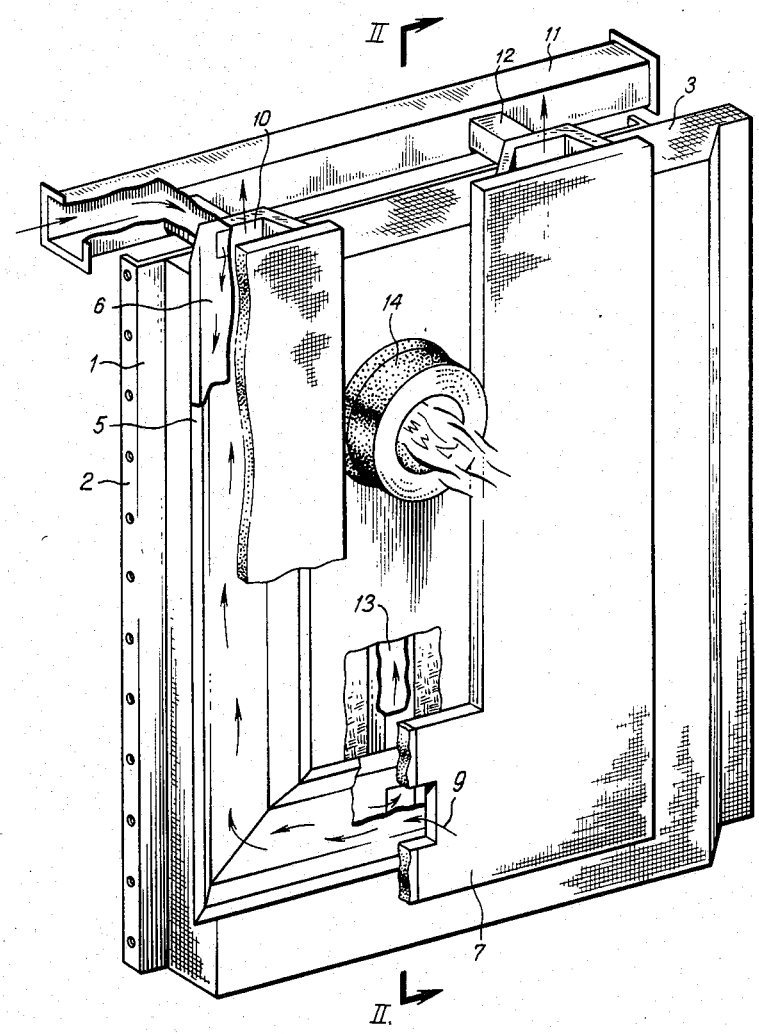
FIG. 1 is a cut-away perspective view of a modular recuperative furnace wall unit according to the present invention.
Figure 2:
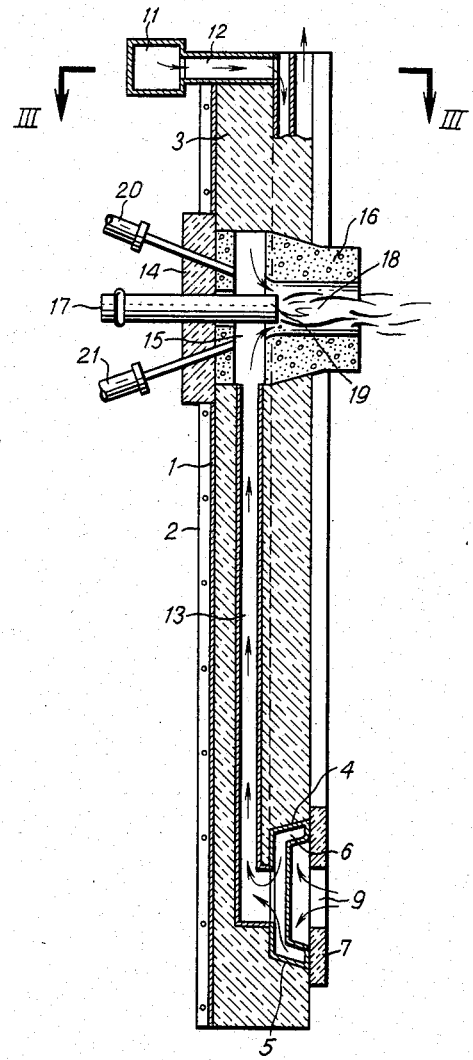
FIG. 2 is a side cross sectional view taken along lines II—II of FIG. 1.
Figure 3:
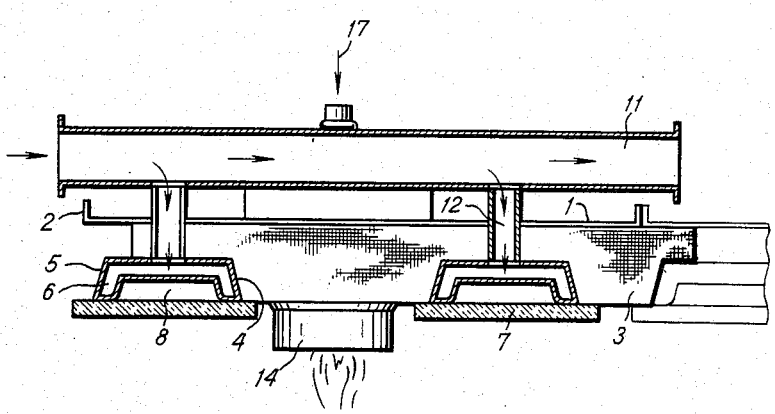
FIG. 3 is a top cross sectional view taken along lines III—III of FIG. 2.

A modular recuperative furnace wall unit which incorporates the method of this invention is illustrated in FIGS. 1 through 3, in which like numbers indicate like parts throughout the several views. The module comprises a metal shell 1 with flanges 2 for joining the modules together. The interior side of the metal shell 1 is lined with ceramic fiber lining 3 which provides insulation for the furnace. The ceramic fiber lining is rated for the temperature range which will exist within the furnace. Slots 4 are formed within said lining and along with a parallel plate recuperator 5 positioned within said slots 4, and substantially covering the sides of the slot 4 which are formed by the fiber lining 3, define enclosed channel 6 for incoming air to be heated prior to combustion. A refractory partition 7 is placed over said slots 4 and forms a channel 8 for exhaust flue gases which enter channel 8 through openings 9. Vent openings 10 are at the top of channels 8 for discharging flue gases. Cold air conduits 11 are connected to openings 12 to the channels 6 and provide the incoming air to the recuperator 5. The arrows in FIGS. 1 through 3 show the flow of the various gases.

The channels 6, 8 and recuperator 5 generally form a U-shape covering substantially the height and width of the module. A hot air conduit 13 is connected at the lower part of channel 6 for delivering preheated air to hot air burner 14. Said hot air conduit 13 connects to the hot air chamber 15, which is located within the refractory lining 3. The burner 14 further comprises a refractory tile 16 located between said hot air chamber 15 and the working furnace chamber, and a fuel inlet pipe 17 for delivery of fuel to the combustion zone 18 of the burner 14.

As mentioned above, the modules are designed to be joined together. By joining a plurality of such modules together with other appropriately designed modular pieces, including panels of only refractory material and corner pieces, it is seen that a complete furnace can be formed using a multiplicity of wall modules to provide a number of barriers to the furnace, each with the advantages disclosed herein. To provide a good seal between said modules, the embodiment shown in FIG. 3 has the vertical edges of the lining 3 designed so that adjoining module edges intermesh behind the recuperator 5 which provides additional covering over the joint.

In operation of the invention as illustrated in FIGS. 1–3 one or more of said modules are incorporated as walls of a furnace. The hot flue gases exit from the furnace through opening 9 and travel along channels 8 and then exit the wall module at vent openings 10. Incoming air is delivered by a blower into conduit 11 and into the incoming air channels 6 at the openings 12. The air travels along said channels 6 where it is heated by heat exchange means whereby heat is transferred from the flue gases in channel 8 through the recuperator 5 to the incoming air. This preheated air moves into the hot air conduit 13 and is introduced into the hot air burner 14. The hot air moves through the hot air chamber 15 to the burner nozzle 19, where said hot air is combined with fuel delivered through the fuel inlet pipe 17. A flame is formed in said nozzle 19 and introduced within the furnace.

In the operation of the hot air burner, the initial ignition of the burner can be made with the pilot 20 and a flame detector 21 may be used for the flame safety system.

Figure 4:
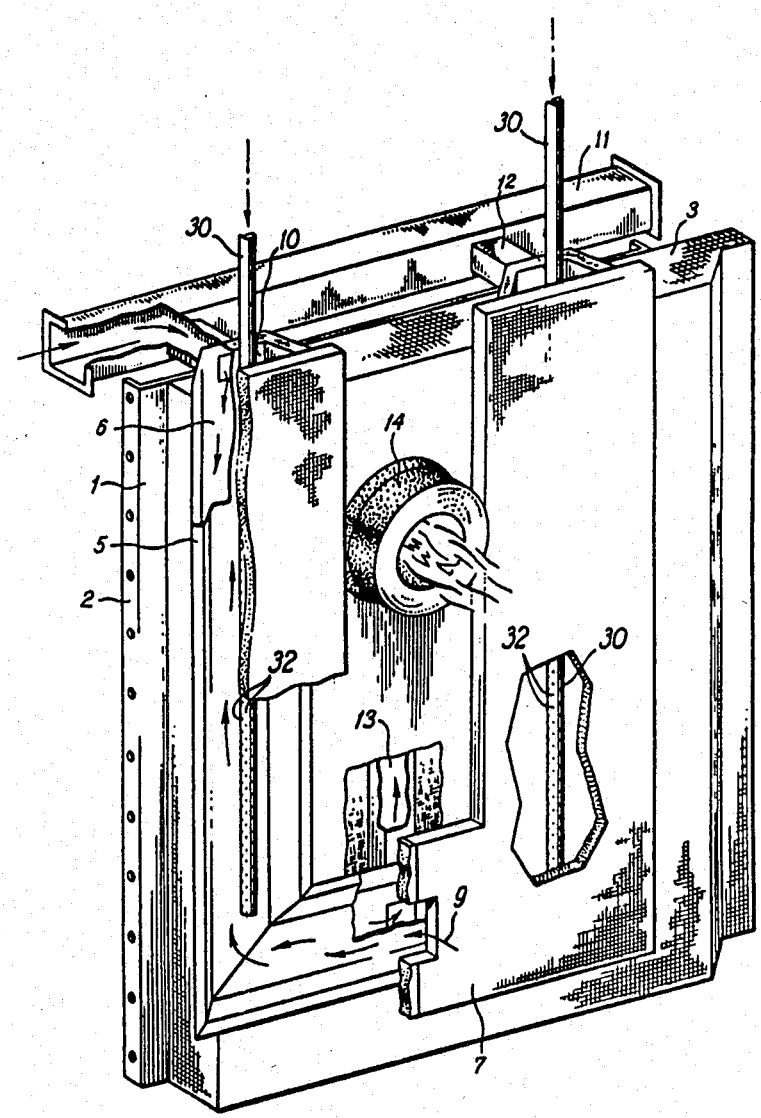
FIG. 4 is a cut-away perspective view of a second embodiment of the invention.

In another embodiment, as shown in FIG. 4, the combustion of the combustible components of the exhaust gases may be arranged inside the flue gas channels 8 by introducing a stream of oxygen containing gas, such as air or pure oxygen, to be combined with the flue gases. This may be accomplished by introducing said air or oxygen into the channels 8 through tubes 30 within said channels 8, wherein the tubes have holes 32 along their length for dispersing the oxygen or air along the flue gas channel. The combustion of the combustible components of the flue gas with the oxygen containing gas will produce additional heat release and raise the temperature of the flue gases. This additional heat will be recovered by the preheating of the combustion air and by heating the refractory partition 7.

From this illustrative embodiment, it can be seen that the invention results in significant improvements in the efficiency of the use of fuels in furnaces. First, the recuperator, air ducts, and burner body are all within the refractory lining, which acts as insulation and provides more efficient preheating of combustion air to the burner. Second, the location of the flue gas channels allows the latent heat of the flue gases to shield the working zone of the furnace from heat losses as well as providing additional useful radiative heat flux from the refractory partition between the flue gases and the furnace.

While the embodiments of the invention have been described in association with an industrial furnace application, it will be understood that other apparatus can be arranged and designed with the described wall modules. Moreover, while this invention has been described in detail with particular reference to the preferred embodiments thereof, it will be understood that variations and modifications can be effected within the spirit and scope of the method and apparatus of the invention as described herein before and as claimed.

What is claimed is:

1. A method of heat delivery and waste heat recovery from the exhaust flue gases of an heating apparatus including a burner and a combustion zone surrounded by insulating walls, which comprises the steps of:
   directing said exhaust flue gases through a first passage within the insulating wall of said heating apparatus prior to final exhaust of said gases, said passage having a first surface area facing away from said combustion zone and a second surface area facing towards said combustion zone;
   directing oxygen containing gases through a second passage within the wall of said heating apparatus in heat exchange relationship with said first passage, and which surrounds said first surface area of said first passage which faces away from the combustion zone of the heating apparatus, for preheating said oxygen containing gases;
   directing said preheated oxygen containing gases to said burner;
   providing fuel to said burner; and
   combusting said fuel with said preheated oxygen containing gases within said burner.

2. The method of claim 1, wherein said oxygen containing gas is air.

3. The method of claim 1, wherein the step of directing preheated oxygen containing gases to said burner is accomplished within the wall of said heating apparatus.

4. The method of claim 1, which comprises the further step of introducing second oxygen containing gases into said first passage, for combusting with combustible products in said hot flue gases.

5. The method of claim 4, wherein said second oxygen containing gas is air.

6. The method of claim 4, wherein said second oxygen containing gas is pure oxygen.

7. The method of claim 4, wherein said gas is a mixture of oxygen and air.

8. A furnace, including walls surrounding a combustion zone, which comprises:
   first passage means for directing exhaust flue gases within the wall of the furnace prior to final exhaust of said gases, said passage having a first surface area facing away from said combustion zone and a second surface area facing towards said combustion zone;
   second passage means for directing oxygen containing gases within the wall of the furnace in heat exchange relationship with said first passage means for preheating said oxygen containing gases wherein said second passage means surrounds said first surface area of said first passage means which faces away from the combustion zone of the furnace;
   burner means for combusting fuel with the preheated oxygen containing gases inside the furnace;
   means for providing fuel to said burner means; and
   third passage means for directing preheated oxygen containing gases from said second passage means to said burner means.

9. The furnace of claim 8, wherein:
   the walls of the furnace comprise refractory lining material; and
   said first, second and third passage means are located completely within said refractory lining material.

10. The furnace of claim 9, wherein:
    said second passage means is a recuperator for heat exchange from the hotter flue gases in said first passage means to the colder oxygen containing gases in said second passage means.

11. The furnace of claim 10, wherein said first and second passage means are formed in a three-sided groove in the refractory lining material of said furnace wall, with said recuperator substantially covering the three sides of the groove and forming a said first passage means when the groove and said recuperator are covered by a refractory partition comprising refractory lining material sealed to said refractory wall.

12. The furnace of claim 10, wherein said oxygen containing gas is air.

13. The furnace of claim 8, which further comprises means for introducing second oxygen containing gases into said first passage means, for combusting with combustible products in said flue gases.

14. An integrated furnace wall module, which comprises:
   an outer metal plate;
   a refractory lining covering the surface of said plate and attached thereto;
   a multiplicity of exhaust gas channels within said refractory lining for exhausting flue gases;
   a burner through said plate and said refractory lining;
   means for supplying fuel to said burner;
   a recuperator within said refractory lining in heat-exchange relationship with said exhaust gas channels;
   means for introducing oxygen containing gases to be heated into said recuperator;
   a conduit for supplying said oxygen containing gases from said recuperator to said burner;
   means for introducing flue gases from the combustion zone of the furnace into said exhaust gas channels; and
   means for exhausting flue gases from said exhaust gas channels generally remote from said flue gas introduction means.

15. The integrated furnace wall module of claim 14.
   a recuperator within aid refractory lining in heat-exchange relationship with said exhaust gas channels;
   means for introducing oxygen containing gases to be heated into said recuperator;
   wherein said conduit is within said refractory lining.

16. The integrated furnace wall module of claim 15, wherein:
   said recuperator is recessed within a groove in said refractory lining and covers substantially the surface of the groove; and
   said exhaust gas channels are formed by a partition comprising refractory material sealed to said refractory lining over said recessed recuperator.

17. The integrated furnace wall module of claim 16, wherein:

said outer plate comprises connection means for connecting said module to other said integrated furnace wall modules; and the edges of said refractory lining are shaped to mate with the corresponding edges of other said modules to form a seal between said modules to prevent loss of heat between said refractory lining edges when said modules are connected.

18. The integrated furnace wall module of claim 17, wherein the edges of said refractory lining are between said recuperator and said outer metal plate, so that the seal between said connected modules is behind said recuperator to additionally ensure that heat from a furnace thus formed is not lost between the modules.

19. A furnace which comprises a plurality of integrated wall modules as described in claim 14.

20. A furnace which comprises a plurality of integrated wall modules as described in claim 15.

21. A furnace which comprises a plurality of integrated wall modules as described in claim 17.

22. The integrated furnace wall module of claim 14, wherein said refractory lining comprises soft refractory fiber material.

23. The integrated furnace wall module of claim 22, wherein said exhaust gas channels are formed by a recessed groove in said refractory lining with a partition comprising refractory material sealed over the groove in air-tight relationship with said refractory lining.

24. The integrated furnace wall module of claim 23, wherein said exhaust gas channels cover at least twenty-five percent of the surface of the said refractory lining.

* * * * *